(12) United States Patent
Wang et al.

(10) Patent No.: US 10,606,132 B2
(45) Date of Patent: Mar. 31, 2020

(54) DISPLAY PANEL, DISPLAY DEVICE, AND METHOD FOR MANUFACTURING DISPLAY PANEL

(71) Applicants: BOE TECHNOLOGY GROUP CO., LTD., Beijing (CN); HEFEI XINSHENG OPTOELECTRONICS TECHNOLOGY CO., LTD, Hefei, Anhui (CN)

(72) Inventors: Hewei Wang, Beijing (CN); Lei Han, Beijing (CN); Peng Jiang, Beijing (CN); Dong Guo, Beijing (CN); Nanhong Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 97 days.

(21) Appl. No.: 15/542,000

(22) PCT Filed: Jun. 1, 2016

(86) PCT No.: PCT/CN2016/084243
§ 371 (c)(1),
(2) Date: Jul. 6, 2017

(87) PCT Pub. No.: WO2017/148029
PCT Pub. Date: Sep. 8, 2017

(65) Prior Publication Data
US 2018/0046003 A1 Feb. 15, 2018
US 2018/0299714 A9 Oct. 18, 2018

(30) Foreign Application Priority Data

Mar. 2, 2016 (CN) .......................... 2016 1 0117900

(51) Int. Cl.
*G02F 1/1343* (2006.01)
*G02F 1/1362* (2006.01)
(Continued)

(52) U.S. Cl.
CPC .......... *G02F 1/1343* (2013.01); *G02F 1/1339* (2013.01); *G02F 1/133345* (2013.01);
(Continued)

(58) Field of Classification Search
CPC ................. G02F 1/1343; G02F 1/1339; G02F 1/133345; G02F 1/136204; G02F 1/136286; G02F 2001/136295
(Continued)

(56) References Cited

U.S. PATENT DOCUMENTS 6,466,289 B1 10/2002 Lee et al.
2007/0085112 A1* 4/2007 Yamazaki ......... H01L 21/28008
257/288

(Continued)

FOREIGN PATENT DOCUMENTS

CN 101221926 A 7/2008
CN 103296033 A 9/2013
(Continued)

OTHER PUBLICATIONS

China First Office Action, Application No. 201610117900.3, dated Apr. 10, 2018, 14 pps.: with English translation.
(Continued)

*Primary Examiner* — Charles S Chang
(74) *Attorney, Agent, or Firm* — Armstrong Teasdale LLP (57) ABSTRACT

The present disclosure relates to a display panel, a display device, and a method for manufacturing a display panel. The display panel has an electrode region, the electrode region including a substrate, a data line layer, and an isolation layer which are provided on the substrate and alternated in a
(Continued)

direction parallel to an upper surface of the substrate, wherein the height of the data line layer is equal to the height of the isolation layer. Since there is no height difference between the data line layer and the spacer layer and there is no groove, the possibility that conductive foreign objects are accumulated at the isolation layer at this time is greatly reduced, the smooth surface is more conducive to the movement of foreign objects, and a cleaning tape can remove the foreign objects.

20 Claims, 6 Drawing Sheets (51) Int. Cl.
  *G02F 1/1333* (2006.01)
  *G02F 1/1339* (2006.01)
(52) U.S. Cl.
  CPC .. *G02F 1/136204* (2013.01); *G02F 1/136286* (2013.01); *G02F 2001/136295* (2013.01)
(58) Field of Classification Search
  USPC .................................................. 349/149–152
  See application file for complete search history.

(56) References Cited

U.S. PATENT DOCUMENTS

2012/0081645 A1* 4/2012 Yoshimura ........ G02F 1/136209
  349/111
2013/0256667 A1* 10/2013 Lee ...................... H01L 29/458
  257/59

FOREIGN PATENT DOCUMENTS

| CN | 103489878 A | 1/2014 |
|---|---|---|
| CN | 103489922 A | 1/2014 |
| CN | 103500746 A | 1/2014 |
| CN | 103984171 A | 8/2014 |
| CN | 105549286 A | 5/2016 |
| KR | 20010019666 A | 3/2001 |

OTHER PUBLICATIONS

English translation of PCT International Search Report, Application No. PCT/CN2016/084243, dated Nov. 30, 2016, 3 pages.
PCT Written Opinion, Application No. PCT/CN2016/084243, dated Nov. 30, 2016, 7 pages.: with English translation of relevant part.

* cited by examiner

DISPLAY PANEL, DISPLAY DEVICE, AND METHOD FOR MANUFACTURING DISPLAY PANEL

CROSS REFERENCE TO RELATED APPLICATIONS

This patent application is a National Stage Entry of PCT/CN2016/084243 filed on Jun. 1, 2016, which claims the benefit and priority of Chinese Patent Application No. 201610117900.3 filed on Mar. 2, 2016, the disclosures of which are incorporated herein in their entirety as a part of the present application.

BACKGROUND

The present disclosure relates to the technical field of display, and in particular, to a display panel, a display device, and a method for manufacturing a display panel.

There are generally four processes to produce a liquid crystal panel: array process, color filter (CF) process, cell process, and module process. The coating of electrode region (Pad) is completed in the array process, and the attaching of COF and PCB is completed in the module process. Before the attaching process in the module process is performed, the electrode region is pressure-cleaned using a cleaning tape.

Under existing technical conditions, a short circuit is eventually caused to data lines in the electrode region in the following two cases.

First, since a data line layer is higher than an adjacent insulating layer, foreign objects are accumulated in the insulating layer when the electrode region is cleaned, and when foreign objects too many are accumulated, a short circuit is caused among the data lines.

Second, since the data line layer is higher than the adjacent insulating layer, the data lines might be caused to tilt toward the insulating layer due to pressure reason or loose array coating during the cleaning of the electrode region, and when too many foreign objects are accumulated, a short circuit is caused between the data lines.

When a short circuit is caused between the data lines in the electrode region, the product will be determined as a not good (NG) product, and it is required to remove the short-circuited data lines with a repair device so as to separate the short-circuited data lines.

BRIEF DESCRIPTION

Provided in embodiments of the present disclosure are a display panel, a display device, and a method for manufacturing a display panel, which can solve the problem that the data lines in the conventional display technology are easily short-circuited and the NG rate of the product is high.

The present disclosure provides display panel.

A first aspect of the present disclosure provides a display panel having an electrode region, the electrode region including a substrate, a data line layer, and an isolation layer which are provided on the substrate and alternated with each other in a direction parallel to an upper surface of the substrate, wherein the height of the data line layer is equal to the height of the isolation layer.

In one embodiment, the data line layer includes a first conductive layer provided on the substrate, and a second conductive layer provided on the first conductive layer.

Alternatively, the data line layer further includes a spacer layer provided between the first conductive layer and the second conductive layer, and a via provided in the spacer layer, the via being used for electrically connecting the first conductive layer and the second conductive layer.

Alternatively, the first conductive layer further extends to an array region of the display panel as a source electrode or a drain electrode of a thin film transistor.

Alternatively, the spacer layer includes a first passivation layer, and the isolation layer includes a second passivation layer.

In one embodiment, the first conductive layer further extends to the array region of the display panel as a gate electrode of the thin film transistor.

Alternatively, the isolation layer includes a passivation layer.

Alternatively, the spacer layer includes a first insulating layer, the isolation layer includes a second insulating layer on the substrate, and a third passivation layer on the second insulating layer.

Alternatively, the ratio of the height of the second conductive layer to the height of the first insulating layer is 1:39.

Alternatively, the spacer layer further includes a fourth passivation layer on the first insulating layer.

Alternatively, the first conductive layer includes a metal, the second conductive layer includes a transparent conductive layer, the substrate includes glass, and the display panel includes a liquid crystal display panel.

The present disclosure also provides a display device.

A second aspect of the present disclosure provides a display device including a display panel as described above.

The present disclosure also provides a method for manufacturing a display panel.

A third aspect of the present disclosure provides a method for manufacturing a display panel including providing a substrate, providing on the substrate a data line layer and an isolation layer which are alternated with each other in a direction parallel to an upper surface of the substrate, wherein the height of the data line layer is equal to the height of the isolation layer.

Alternatively, the data line layer includes a first conductive layer provided on the substrate, and a second conductive layer provided on the first conductive layer.

Alternatively, the data line layer further includes a spacer layer provided between the first conductive layer and the second conductive layer, and a via provided in the spacer layer, the via being used for electrically connecting the first conductive layer and the second conductive layer.

In one embodiment, the first conductive layer further extends to the array region of the display panel as a source electrode or a drain electrode of a thin film transistor, the method further includes forming the first conductive layer on a substrate and patterning the first conductive layer to form a first conductive layer unreserved region and a first conductive layer reserved region which are alternated with each other, providing a passivation layer on the first conductive layer unreserved region and on the first conductive layer reserved region, removing the passivation layer from the first conductive layer reserved region, providing a second conductive layer on the first conductive layer unreserved region and on the first conductive layer reserved region, and removing the second conductive layer from the first conductive layer unreserved region.

Alternatively, the passivation layer on the first conductive layer reserved region is partially removed, the method further includes providing a via in a passivation layer on the first conductive layer reserved region, the via being used for electrically connecting the first conductive layer and the second conductive layer.

In one embodiment, the first conductive layer also extends to the array region of the display panel as a gate electrode of a thin film transistor, the method further includes forming the first conductive layer on a substrate and patterning the first conductive layer so that it has a first conductive layer unreserved region and a first conductive layer reserved region which are alternated, providing an insulating layer on the first conductive layer unreserved region and the first conductive layer reserved region, providing a passivation layer on the insulating layer, partially removing the passivation layer on the first conductive layer reserved region, providing, in the passivation layer and the insulating layer on the first conductive layer reserved region, a via that connects the first conductive layer, providing a second conductive layer on the first conductive layer unreserved region and on the first conductive layer reserved region, and removing the second conductive layer on the first conductive layer unreserved region, wherein the via is used for electrically connecting the first conductive layer and the second conductive layer.

Alternatively, the passivation layer of the first conductive layer reserved region is completely removed, the method further includes partially removing the insulating layer on the first conductive layer reserved region.

Alternatively, the height of the insulating layer of the first conductive layer reserved region is removed by one-fortieth (1/40).

Alternatively, the first conductive layer includes a metal, the second conductive layer includes a transparent conductive layer, the substrate includes glass, and the display panel includes a liquid crystal display panel.

Further, after the formation of the electrode region of the display panel, a step of cleaning the electrode region is further included.

Further, the step of cleaning the electrode region includes pressure cleaning the electrode region with a cleaning tape.

With the display panel, the display device, and the method for manufacturing the display panel provided by the embodiments of the present disclosure, by providing a substrate in the electrode region of the display panel and by providing on the substrate a data line layer and an isolation layer that are alternated with each other in a direction parallel to the upper surface of the substrate so that the height of the data line layer is equal to the height of the isolation layer, a short circuit caused by the tilting of the data lines can effectively be prevented, reducing equipment investment and personnel costs, improving product yield per product.

BRIEF DESCRIPTION OF THE DRAWINGS

In order to more clearly illustrate the technical solutions of the embodiments of the present disclosure, the drawings of the embodiments will be briefly described below. It should be understood that the drawings described below merely relate to some embodiments of the present disclosure rather than limiting the present disclosure, in which.

DETAILED DESCRIPTION

To make the technical solutions and advantages of the present disclosure clearer, the technical solutions of the embodiments of the present disclosure will be clearly and completely described below in conjunction with the drawings. Obviously, the embodiments described are part of embodiments of the present disclosure, instead of all the embodiments. Based on the described embodiments of the present disclosure, all other embodiments obtained by those skilled in the art without creative work also fall within the scope of protection sought for by the present disclosure.

When describing elements of the present disclosure and embodiments thereof, the articles "a", "an", "the" and "said" are intended to mean the presence of one or more elements. The terms "including", "comprising", "containing" and "having" are intended to be inclusive and to indicate that there may be additional elements other than the listed elements.

For the purpose of the literal description below, the terms "up", "down", "left", "right", "vertical", "horizontal", "top", "bottom" and derivatives thereof should relate to the present disclosure as denoted in the direction as in the drawings. The term "overriding", "on top of", "provided on . . . ", or "provided on top of" means that a first element such as a first structure exists on a second element such as a second structure, wherein an intermediate element such as an interface structure may exist between the first element and the second element. The term "contacting" means connecting a first element such as a first structure and a second element such as a second structure, while there may be or may not be other element at the interface of the two elements.

Figure 1:
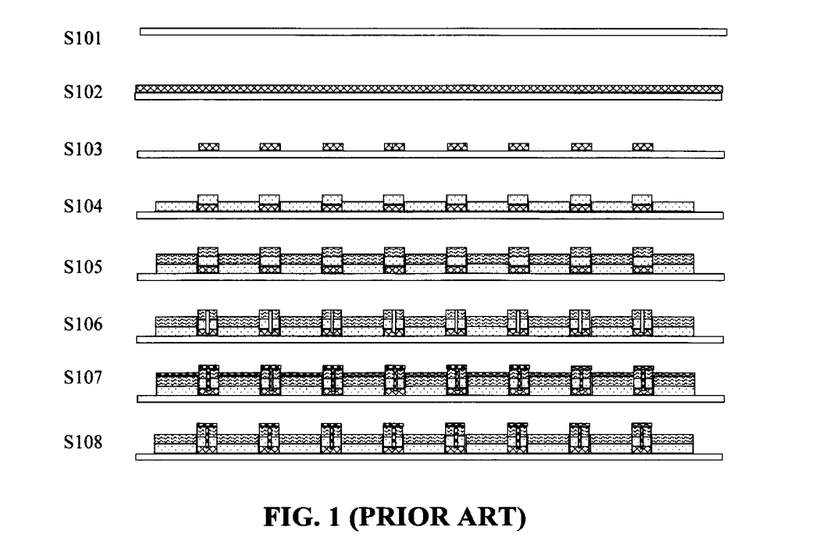
FIG. 1 is a schematic view of a manufacturing process of an electrode region of a prior art display panel in which a gate metal layer is used as a part of a data line layer of the electrode region.

FIG. 1 shows a schematic view of a solution in which a gate metal layer is used as a part of a data line layer, with the following manufacturing steps:

S101: providing a glass substrate.

S102: depositing a gate metal layer on the glass substrate.

S103: patterning the gate layer metal into a specific shape by processes such as exposure, development and peeling.

S104: coating a gate insulating (GI) layer.

S105: coating a passivation (PVX) layer.

S106: manufacturing a via which passes through the passivation layer to reach the gate layer through a dry etching process. At this point, heights of the PVX layer and the GI layer are unchanged. After this process, the height of the data line layer has been greater than the height of the insulating layer, and the height difference between the two is the height of the gate metal layer.

S107: coating an indium tin oxide (ITO) layer, wherein the ITO above the gate layer is connected to the gate through the via.

S108: performing processes such as exposure, development and peeling so that the ITO above the gate layer is retained and the ITO at other positions is removed. At the time, the height of the film layer at the data lines is already greater than the height of the insulating layer, and the height difference is the sum of the height of the gate layer plus the height of the ITO layer.

Figure 2:
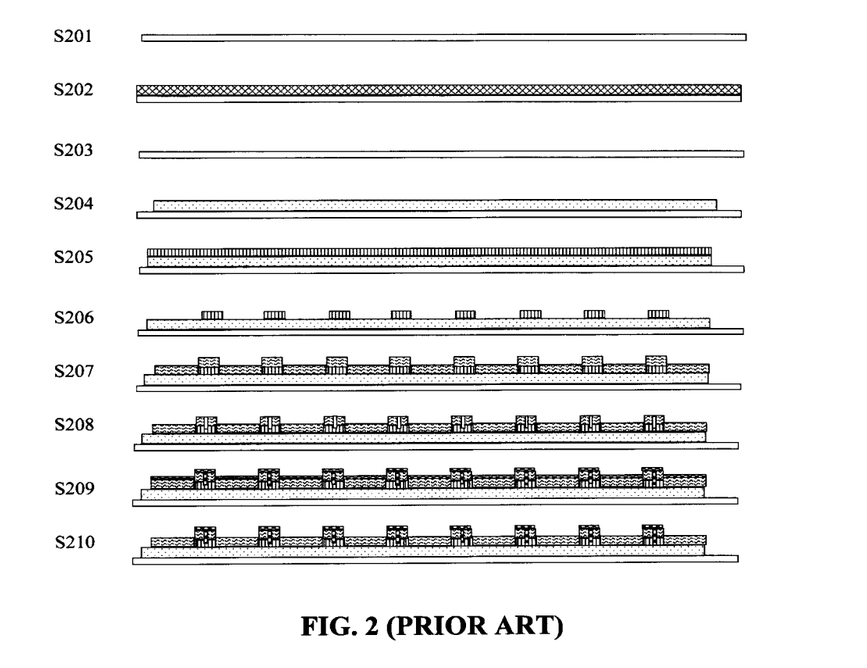
FIG. 2 is a schematic view of a manufacturing process of an electrode region of a prior art display panel in which a source/drain metal layer is used as a part of a data line layer of the electrode region.

FIG. 2 shows another schematic view of using a source/drain metal layer as a part of a data line layer, with the following manufacturing steps:

S201: providing a glass substrate.

S202: coating a gate metal layer.

S203: completely removing the gate layer metal in an electrode region by processes such as exposure, development and peeling.

S204: coating a gate insulating (GI) layer.

S205: coating a source/drain metal electrode layer.

S206: patterning the source/drain metal electrode layer into a specific shape by processes such as exposure, development and peeling.

S207: coating a passivation (PVX) insulating layer.

S208: manufacturing a via through a dry etching process, the via passing through the PVX layer to reach the source/drain metal layer. At this point, the height of the PVX layer is unchanged. After this process, the height of the film layer at the data lines has been greater than the height of the insulating layer, and the height difference between the two is the height of the source/drain metal layer.

S209: coating an ITO metal layer, the ITO above the source/drain metal layer being connected to the source/drain through the via.

S210: performing processes such as exposure, development and peeling so that the ITO above the source/drain layer is retained while the ITO at other positions is removed. At the time, the height of the data line layer is already greater than the height of the insulating layer, and the height difference is the sum of the height of the source/drain layer plus the height of the ITO layer.

After the above process steps shown in FIG. 1 or FIG. 2, for example, when reaching the electrode region cleaning of the module process, there is a risk that the data lines are short-circuited.

In view of the above-mentioned potential problems, the present disclosure provides a solution capable of setting the data line layer to have the same height as the isolation layer provided between the data line layers.

The electrode region of the display panel of the present disclosure includes a substrate, a data line layer, and an isolation layer provided on the substrate, wherein the data line layer and the isolation layer are alternated in a direction parallel to the upper surface of the substrate, and the height of the data line layer is equal to the height of the isolation layer. The data line layer includes a first conductive layer provided on the substrate and a second conductive layer provided on the first conductive layer.

In one embodiment, a gate electrode (e.g., metal) is used as part of the data line layer in the electrode region of the display panel, i.e. the first conductive layer also extends to the array region of the display panel as a gate electrode of the thin film transistor. A spacer layer is provided between the first conductive layer and the second conductive layer, and the spacer is provided with a via which is used for electrically connecting the first conductive layer and the second conductive layer, which is located at the center of the spacer layer, and which may be filled with the material of the second conductive layer. The spacer layer includes a gate insulating layer (first insulating layer) on the gate electrode layer. Alternatively, the spacer layer further includes a passivation layer (fourth passivation layer) on the gate insulating layer. In this case, the isolation layer includes an insulating layer (second insulating layer) on the gate side and a passivation layer (third passivation layer) on the insulating layer.

It is to be noted that the expression such as "fourth layer" of the present disclosure is merely the name of a particular layer and is not used to limit the number of kinds of layers. For example, "second passivation layer" does not mean that two passivation layers are required. It may mean that there is only one passivation layer, which is referred to as a "second passivation layer". In addition, although one end of the via shown in the figure extends to the first conductive layer, it may also contact only the upper surface of the first conductive layer without extending into the first conductive layer as long as the via can form a conductive connection to the first conductive layer.

Figure 3A:
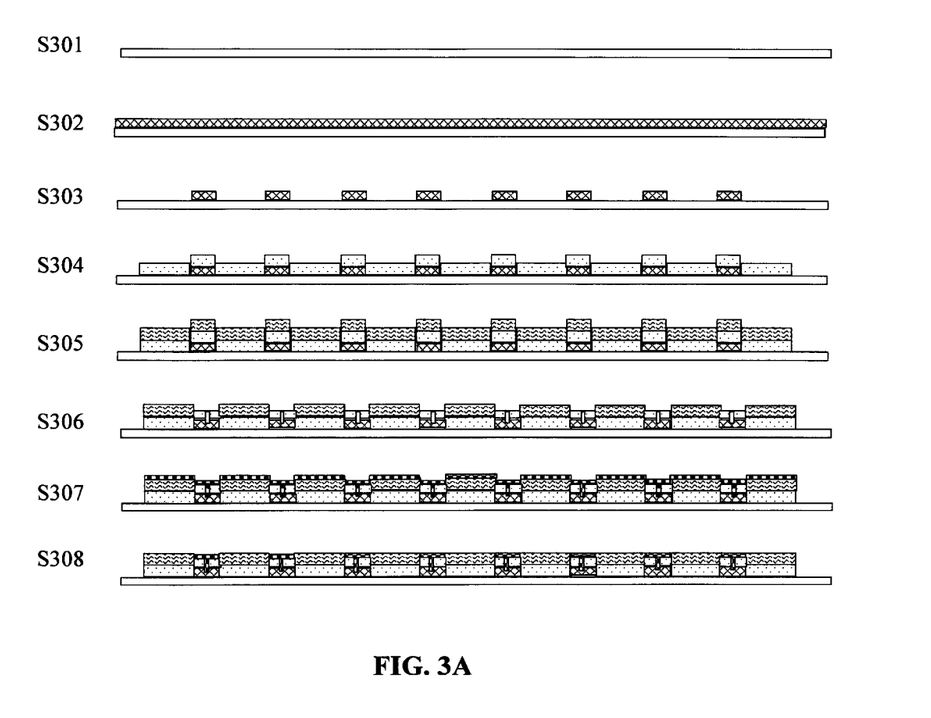
FIG. 3A is a schematic view of a manufacturing process of an electrode region of a display panel according to an embodiment of the present disclosure in which a gate electrode is used as a part of a data line layer.
Figure 3B:
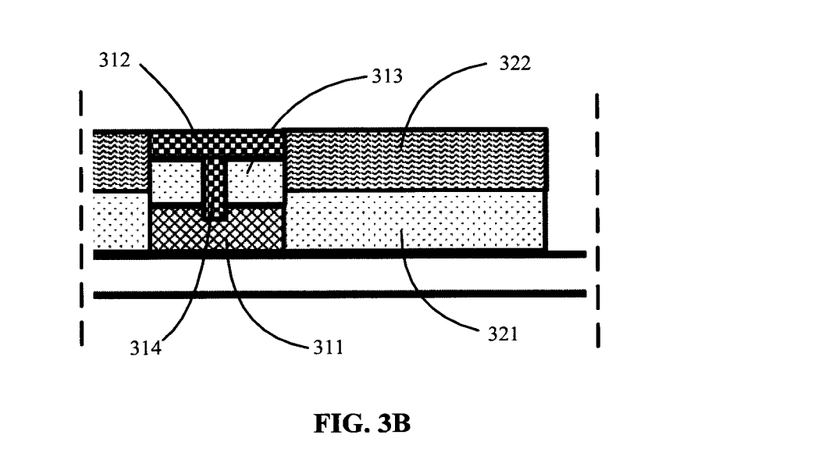
FIG. 3B is a partially enlarged view of the electrode region of the display panel manufactured according to the manufacturing process of FIG. 3A.

Specifically, in one embodiment, as shown in FIG. 3B, the data line layer includes a first conductive layer 311 (gate electrode layer), a first insulating layer 313, a second conductive layer 312, and a via 314. Wherein, the first insulating layer 313 is located between the first conductive layer 311 and the second conductive layer 312, and the via 314 is provided in a spacer layer formed by the first insulating layer 313, and the via passes through the first insulating layer 313 from the second conductive layer 312 to reach the first conductive layer 311, for example at the center of the first insulating layer 313. The isolation layer includes a second insulating layer 321 and a third passivation layer 322 provided on the second insulating layer.

Figure 4A:
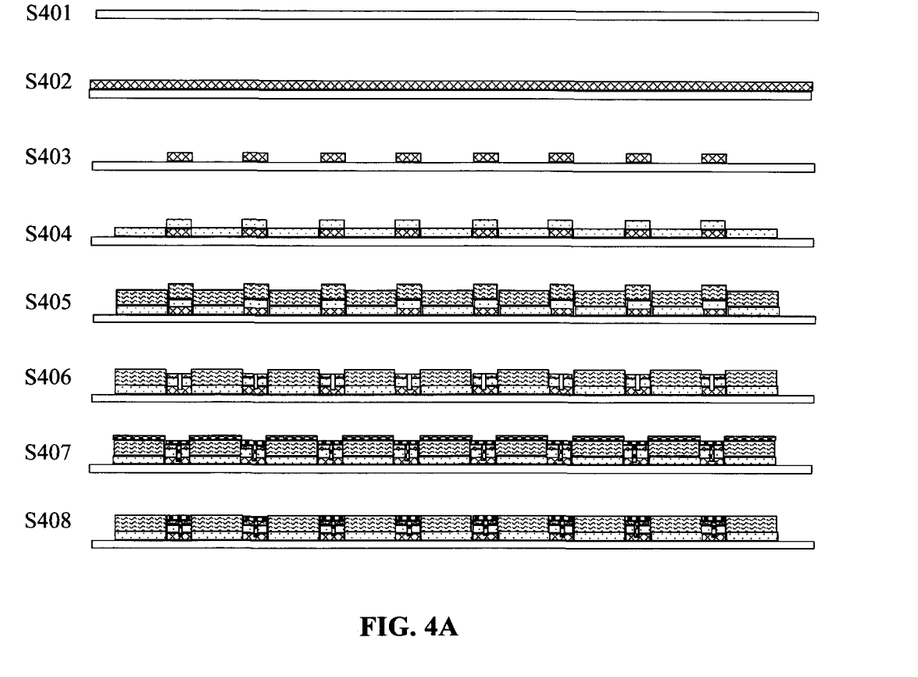
FIG. 4A is a schematic view of a manufacturing process of an electrode region of a display panel according to another embodiment of the present disclosure in which a gate electrode is used as a part of a data line layer.
Figure 4B:
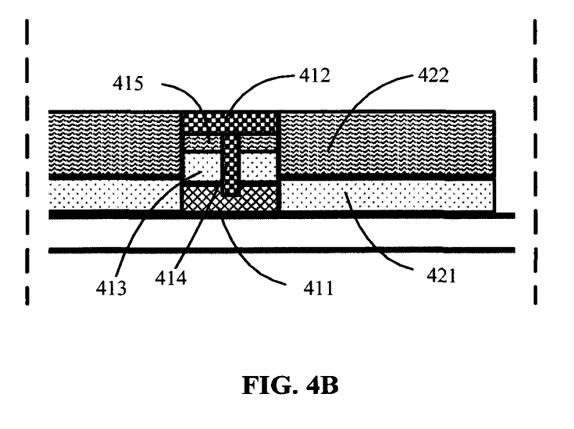
FIG. 4B is a partially enlarged view of the electrode region of the display panel manufactured according to the manufacturing process of FIG. 4A.

Specifically, in another embodiment, as shown in FIG. 4B, the data line layer includes a first conductive layer 411, a first insulating layer 413, a fourth passivation layer 415, a second conductive layer 412, and a via 414, wherein the via 414 is provided in the spacer layer formed by the first insulating layer 413 and the fourth passivation layer 415, for example at the center of the spacer layer. The isolation layer includes a second insulating layer 421 and a third passivation layer 422.

In one embodiment, the source or drain layer metal is used as part of the data line layer, i.e. the first conductive layer also extends to the array region of the display panel as a source or drain electrode of the thin film transistor. The first conductive layer and the second conductive layer may be in direct contact, or a spacer layer may be provided therebetween. The spacer layer may be a passivation layer (first passivation layer), and is provided with a via which is used for electrically connecting the first conductive layer and the second conductive layer and which may be filled with the material of the second conductive layer. In this embodiment, the isolation layer also includes a passivation layer (second passivation layer).

Figure 5A:
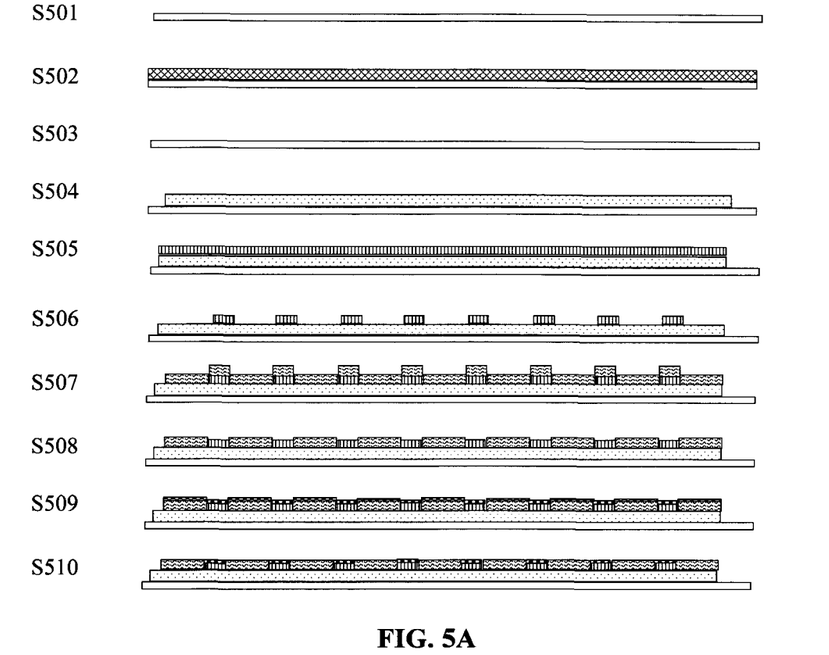
FIG. 5A is a schematic view of a manufacturing process of an electrode region of a display panel according to a still another embodiment of the present disclosure in which a source/drain electrode is used as a part of a data line layer.
Figure 5B:
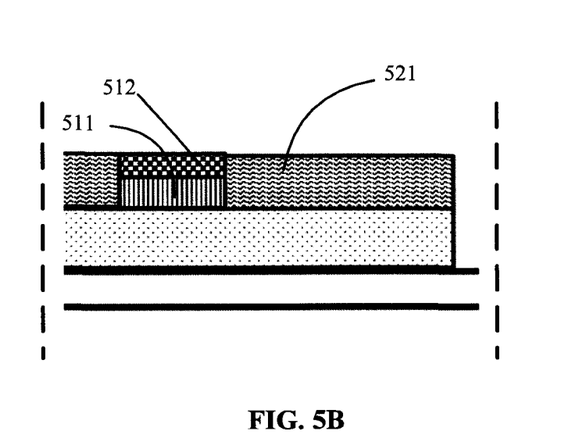
FIG. 5B is a partially enlarged view of the electrode region of the display panel manufactured according to the manufacturing process of FIG. 5A.

Specifically, in one embodiment, as shown in FIG. 5B, the data line layer includes a first conductive layer 511 and a second conductive layer 512. The isolation layer includes a second passivation layer 521.

Figure 6A:
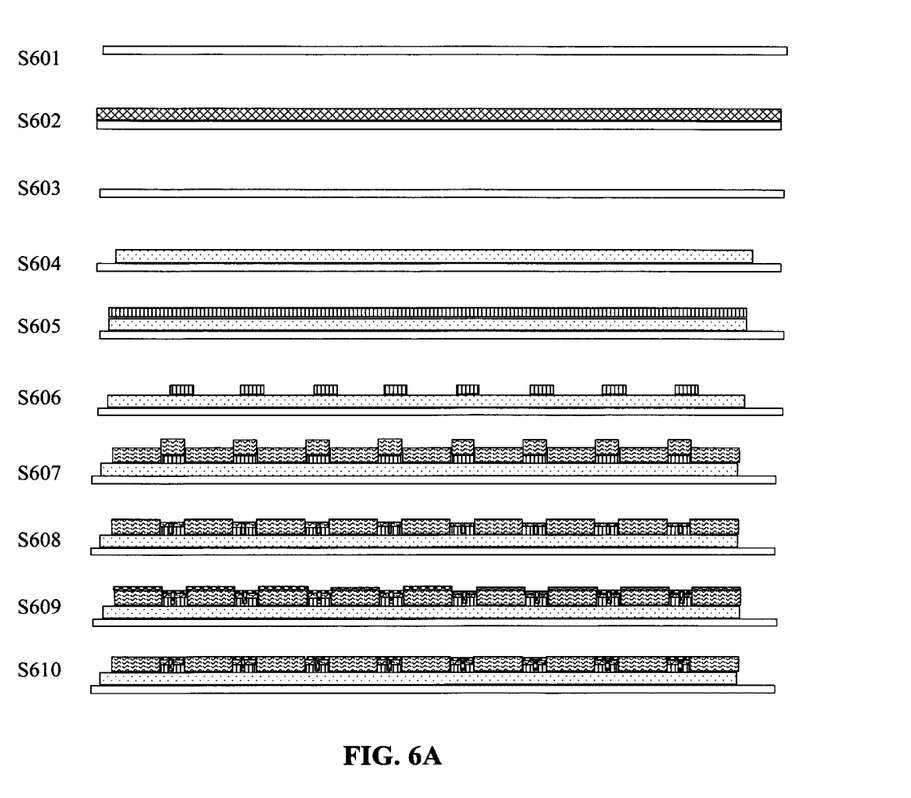
FIG. 6A is a schematic view of a manufacturing process of an electrode region of a display panel according to a yet another embodiment of the present disclosure in which a source/drain electrode is used as a part of a data line layer.
Figure 6B:
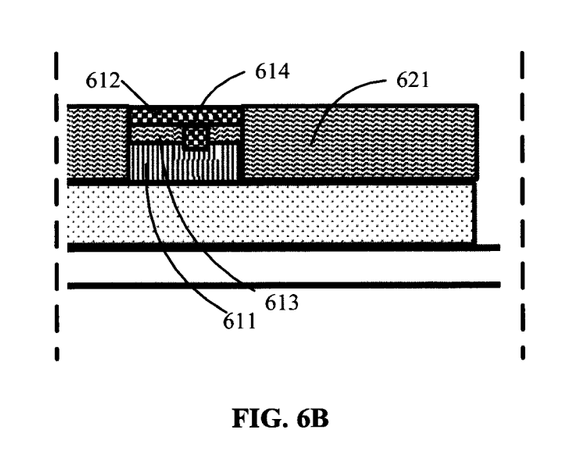
FIG. 6B is a partially enlarged view of the electrode region of the display panel manufactured according to the manufacturing process of FIG. 6A.

Specifically, in another embodiment, as shown in FIG. 6B, the data line layer includes a first conductive layer 611, a first passivation layer 613, a second conductive layer 612, and a via 614. Wherein the via 614 is provided in the first passivation layer 613. The isolation layer includes a second passivation layer 621.

The display panel of the present disclosure includes, but is not limited to, a liquid crystal display panel. The substrate may be a glass substrate or other suitable material. The first conductive layer may be a metal layer of an electrode suitable for a source, a drain or a gate of a thin film transistor, or may be other suitable material. The second conductive layer may be an ITO layer, or may be other suitable transparent conductive layer.

FIGS. 3A-6B also exemplarily illustrate a manufacturing process of an electrode region of a display panel of a different embodiment of the present disclosure. The method of the present disclosure provides a substrate, a data line layer, and a isolation layer which are provided on the substrate and are alternated in a direction parallel to the upper surface of the substrate, and sets the height of the data line layer to be equal to the height of the isolation layer.

In particular, in one embodiment, when the gate layer metal is used as the first conductive layer, that is, when the first conductive layer also extends to the array region of the display panel as the gate electrode of the thin film transistor, with reference to FIG. 3A and FIG. 4A, the following exemplary method can be used:

S1: providing a substrate (as shown in step S301 or step S401), wherein the substrate material may be any suitable substrate material in the art, for example, glass.

S2: providing a gate metal layer as a first conductive layer on the substrate (as shown in step S302 or S402).

S3: patterning the gate metal layer so that it has a first conductive layer unreserved region and a first conductive layer reserved region which are alternated (as shown in step S303 or S403). Wherein, the patterning process may be any suitable process known to those skilled in the art, for example, a photolithography process including exposure, development and etching.

S4: providing an insulating layer on the first conductive layer unreserved region and the first conductive layer reserved region (as shown in step S304 or S404).

S5: providing a passivation layer on the insulating layer (as shown in step S305 or S405).

S6: completely (see S306 in FIG. 3A) or partially (see S406 in FIG. 4A) removing the passivation layer on the first conductive layer reserved region according to the specific height of the layer.

S7: providing a via which is used for electrically connecting the first conductive layer and the second conductive layer (as shown in step S307 or S407). The via can be formed by a dry etching process. In the case where the passivation layer on the first conductive layer reserved region is completely removed, as shown in FIGS. 3A-3B, a via is provided in the insulating layer. In the case where the passivation layer on the reserved region of the first conductive layer is partially removed, as shown in FIGS. 4A-4B, a via is provided in the passivation layer and the insulating layer.

S8: providing a second conductive layer, such as a transparent conductive oxide. The transparent conductive oxide includes, but is not limited to, ITO. In one embodiment, the second conductive layer (as shown in step S307 or S407) is integrally deposited over the data line layer and the spacer layer, and then is patterned (e.g., using a photolithography process) to form a second conductive layer unreserved region and a second conductive layer reserved region which are alternated (as shown in step S308 or S408). The second conductive layer unreserved region and the second conductive layer reserved region correspond to the first conductive layer unreserved region and the first conductive layer reserved region, respectively. Thus, there is no second conductive layer at the isolation layer but there is a second conductive layer at the data line layer.

It can be seen that, in the case where the passivation layer on the first conductive layer reserved region is completely removed, as shown in FIGS. 3A-3B, it is also possible to further remove a portion of the insulating layer on the first conductive layer reserved region (for example, to remove the height by one-fortieth). In this case, the spacer layer between the first conductive layer and the second conductive layer is formed by an insulating layer, and the via is formed in the insulating layer.

In the case where the passivation layer portion on the first conductive layer reserved region is partially removed, as shown in FIGS. 4A-4B, the spacer layer between the first conductive layer and the second conductive layer is formed by an insulating layer and a passivation layer, and the via is formed in the insulating layer and the passivation layer.

In another embodiment, when the source/drain layer metal is used as the first conductive layer, that is, the first conductive layer also extends to the array region of the display panel as the source/drain electrode of the thin film transistor, with reference to FIG. 5A and FIG. 6A, the following exemplary method may be employed:

S1: providing a substrate (as shown in step S501 or step S601), wherein the substrate material may be any suitable substrate material in the art, for example, glass. Alternatively, in view of actual production requirements of the display panel including the electrode region and the array region, a gate metal layer (as shown in step S502 or step S602) may further be provided on the substrate of the display panel, and then, the gate metal layer of the electrode region is removed (as shown in step S503 or step S603) using the patterning process (for example, by photolithography). After removing the gate metal layer of the electrode region, a gate insulating layer may be further provided (as shown in step S504 or step S604). It is to be noted that, in the case of using the source/drain layer metal as part of the data line layer, it is not necessary to provide the gate and the gate insulating layer for the electrode region.

S2: providing a source/drain metal layer as a first conductive layer (as shown in step S505 or step S605) on the substrate.

S3: patterning the source/drain metal layer (as shown in step S506 or step S606) to form a first conductive layer unreserved region and a first conductive layer reserved region which are alternated with each other. Wherein, the patterning process may be any suitable process known to those skilled in the art, for example, a photolithography process.

S4: providing a passivation layer on the first conductive layer unreserved region and the first conductive layer reserved region (as shown in step S507 or step S607).

S5: completely (see S508 in FIG. 5A) or partially (see S608 in FIG. 6A) removing the passivation layer on the first conductive layer reserved region according to the specific height of the layer. For the case shown in FIGS. 6A-6B, step S5 further includes providing a via in the remaining passivation layer to electrically connect the first conductive layer and the second conductive layer (see step S608).

S6: providing a second conductive layer such as an ITO layer. In one embodiment, the second conductive layer is integrally deposited at the data line layer and the spacer layer (as shown in step S509 or step S609), and then is patterned (e.g., using a photolithography process) to form a second conductive layer unreserved region and a second conductive layer reserved region which are alternated with each other (as shown in step S510 or step S610). Moreover, the second conductive layer unreserved region and the second conductive layer reserved region correspond to the first conductive layer unreserved region and the first conductive layer reserved region, respectively. Thus, there is no second conductive layer at the isolation layer but there is a second conductive layer at the data line layer position.

It can be seen that, in the case where the passivation layer on the first conductive layer reserved region is completely removed, as shown in FIGS. 5A-5B, there is no spacer layer between the first conductive layer and the second conductive layer. In the case where the passivation layer portion on the first conductive layer reserved region is partially removed, as shown in FIGS. 6A-6B, the spacer layer between the first conductive layer and the second conductive layer is formed by a passivation layer, and the via is formed in the passivation layer, preferably at the center of the passivation layer.

Figure 7:
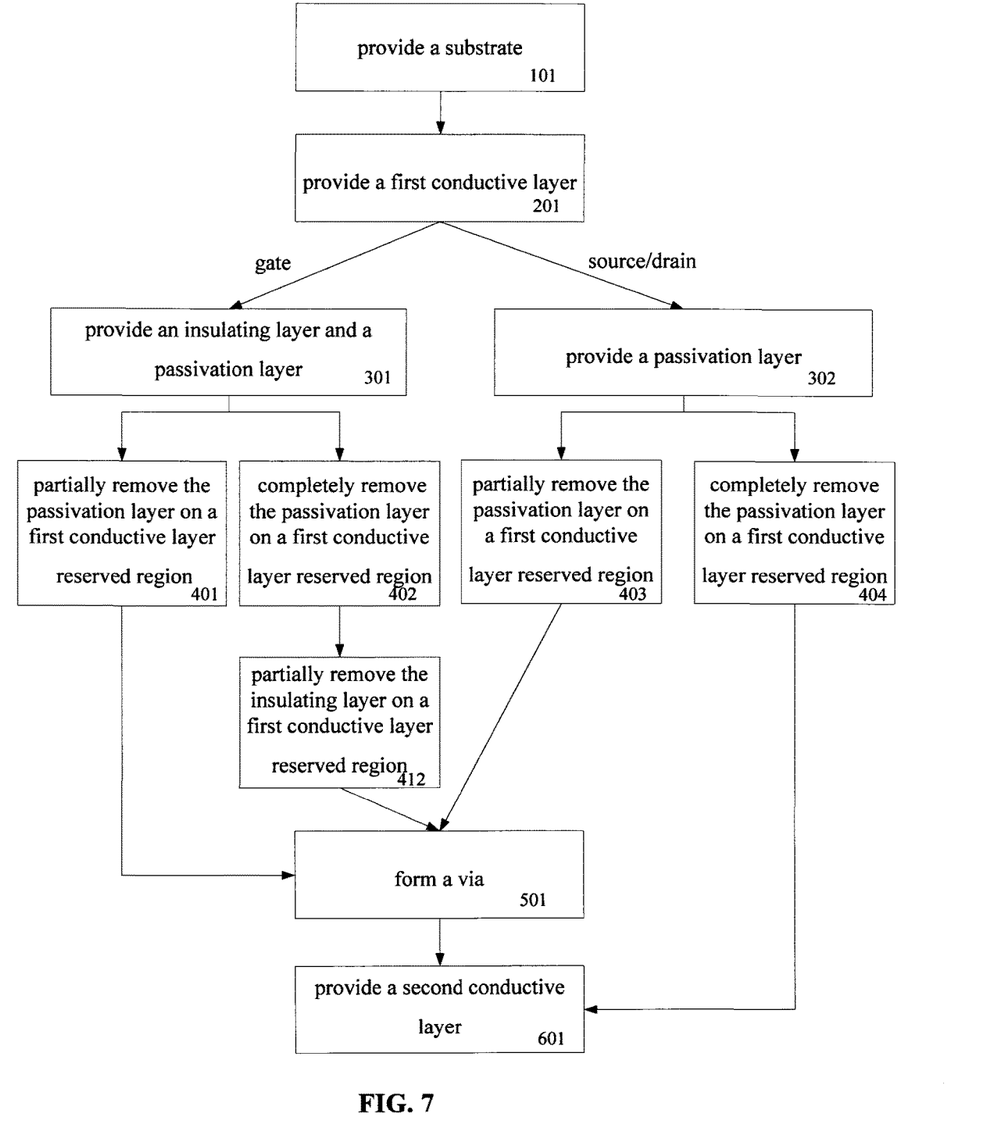
FIG. 7 is a flow chart of a method of one embodiment of the present disclosure.

FIG. 7 shows a flow chart of an illustrative method of one embodiment of the present disclosure. In block 101, a substrate is provided. In block 201, a first conductive layer is provided. The first conductive layer may be patterned to form a first conductive layer reserved region and a first conductive layer unreserved region such that a first conductive layer exists at the data line layer but no first conductive layer exists at the isolation layer. In block 301, when the first conductive layer also extends to the array region of the display panel as the gate electrode of the thin film transistor, an insulating layer and a passivation layer are provided. In block 302, when the first conductive layer also extends to the array region of the display panel as a source/drain electrode of the thin film transistor, a passivation layer is provided. In the blocks 401, 402, 403, and 404, the passivation layer on the first conductive layer reserved region (corresponding to the data line layer) is partially or completely removed according to the height requirement of the layer. In block 412, the insulating layer on the first conductive layer reserved region is further partially removed. In block 501, a via is provided for electrically connecting the first conductive layer and the second conductive layer. In block 601, a second conductive layer is provided at the data line layer.

The flow chart depicted in the present disclosure is merely an example. Numerous variations of the flow chart or the steps described therein may be present without departing from the spirit of the present disclosure. For example, the steps may be performed in a different order, or the steps may be added, deleted, or modified. These variants are considered to be part of the claimed aspects.

It is to be understood from the foregoing description that the solution of the present disclosure can keep the data lines and the insulating layers in a horizontal plane in the array coating process, without adding more to the existing mask, by adjusting the relationship between the height of the data line layer and the height of the isolation layer so that the height of the isolation layer is finally equal to the height of the data line layer.

When performing the step of cleaning the electrode region after the formation of the electrode region of the display panel, for example, when pressure cleaning the electrode region by using a cleaning tape, since there is no height difference between the data line layer and the isolation layer and there is no groove, the possibility that conductive foreign objects are accumulated at the isolation layer at this time is greatly reduced, the smooth surface is better to the movement of foreign objects, and the cleaning tape can remove the foreign objects. In addition, when the cleaning tape is used to clean the data lines of the electrode region with a certain pressure, it is possible to prevent the occurrence of the case where the cleaning tape causes the data lines of the electrode region to tilt. Thus, the solution of the present disclosure can greatly improve the cleaning rate of the electrode region and reduce foreign objects in the electrode region, greatly reducing the occurrence rate of data line short circuit after the module attaching process, reducing equipment investment and personnel costs, improving product yield per product.

Some particular embodiments have been described, and these embodiments are presented by way of example only and are not intended to limit the scope of the present disclosure. In fact, the novel embodiments described herein may be embodied in other various forms. In addition, various omissions, substitutions and alterations in the form of embodiments described herein may be made without departing from the spirit of the present disclosure. The appended claims and the equivalents thereof are intended to cover such forms or alterations which fall within the spirit and scope of the present disclosure.

What is claimed is:

1. A display panel comprising an electrode region, an array region and a thin film transistor, wherein the thin film transistor is only located in the array region, the electrode region comprising:
a substrate;
a data line layer; and
an isolation layer provided on the substrate, wherein the data line layer and the isolation layer are alternated with each other in a direction parallel to an upper surface of the substrate, and wherein a height of the data line layer is equal to a height of the isolation layer.

2. The display panel according to claim 1, wherein the data line layer comprises:
a first conductive layer provided on the substrate; and
a second conductive layer provided on the first conductive layer.

3. The display panel according to claim 2, wherein the data line layer further comprises i) a spacer layer provided between the first conductive layer and the second conductive layer, and ii) a via provided in the spacer layer, the via electrically connecting the first conductive layer and the second conductive layer.

4. The display panel according to claim 3, wherein the first conductive layer further extends to the array region of the display panel as one of a source electrode and a drain electrode of a thin film transistor.

5. The display panel according to claim 4, wherein the spacer layer comprises a first passivation layer, and wherein the isolation layer comprises a second passivation layer.

6. The display panel according to claim 2, wherein the first conductive layer further extends to the array region of the display panel as one of a source electrode and a drain electrode of the thin film transistor.

7. The display panel according to claim 6, wherein the isolation layer comprises a passivation layer.

8. The display panel according to claim 3, wherein the first conductive layer further extends to the array region of the display panel as a gate electrode of the thin film transistor.

9. The display panel according to claim 8, wherein the spacer layer comprises a first insulating layer, and wherein the isolation layer comprises a second insulating layer on the substrate and a third passivation layer on the second insulating layer.

10. The display panel according to claim 9, wherein a ratio of a height of the second conductive layer to a height of the first insulating layer is 1:39.

11. The display panel according to claim 9, wherein the spacer layer further comprises a fourth passivation layer on the first insulating layer.

12. The display panel according to claim 1, wherein:
the first conductive layer comprises a metal;
the second conductive layer comprises a transparent conductive layer,
the substrate comprises glass; and
the display panel comprises a liquid crystal display panel.

13. A display device, comprising a display panel according to claim 1.

14. A method for manufacturing a display panel comprising an electrode region, an array region and a thin film transistor, wherein the thin film transistor is only located in the array region, the method comprising:
providing a substrate comprising a first region corresponding to the electrode region and a second region corresponding to the array region; and
providing on the first region of the substrate a data line layer and an isolation layer that are alternated with each other in a direction parallel to an upper surface of the substrate, wherein a height of the data line layer equal to a height of the isolation layer.

15. The manufacturing method according to claim 14, wherein the data line layer includes:
a first conductive layer provided on the first region of the substrate; and
a second conductive layer provided on the first conductive layer.

16. The manufacturing method according to claim 15, wherein the data line layer further includes i) a spacer layer provided between the first conductive layer and the second conductive layer, and ii) a via provided in the spacer layer, the via electrically connecting the first conductive layer and the second conductive layer.

17. The manufacturing method according to claim 15, wherein the first conductive layer further extends to the array region of the display panel as one of a source electrode and a drain electrode of a thin film transistor, the method further comprising:
forming the first conductive layer on the substrate and patterning the first conductive layer to form a first conductive layer unreserved region and a first conductive layer reserved region which are alternated with each other,
providing a passivation layer on the first conductive layer unreserved region and on the first conductive layer reserved region;
removing the passivation layer on the first conductive layer reserved region;
providing the second conductive layer on the first conductive layer unreserved region and on the first conductive layer reserved region; and
removing the second conductive layer on the first conductive layer unreserved region.

18. The manufacturing method according to claim 17, wherein the passivation layer on the first conductive layer reserved region is partially removed, the method further comprising:
providing a via in the passivation layer on the first conductive layer reserved region, the via electrically connecting the first conductive layer and the second conductive layer.

19. The manufacturing method according to claim 15, wherein the first conductive layer further extends to the array region of the display panel as a gate electrode of a thin film transistor, the method further comprising:
forming the first conductive layer on the substrate and patterning the first conductive layer to form a first conductive layer unreserved region and a first conductive layer reserved region which are alternated with each other;
providing an insulating layer on the first conductive layer unreserved region and the first conductive layer reserved region;
providing a passivation layer on the insulating layer,
partially removing the passivation layer on the first conductive layer reserved region;
providing, in the passivation layer and the insulating layer on the first conductive layer reserved region, a via that connects the first conductive layer,
providing the second conductive layer on the first conductive layer unreserved region and on the first conductive layer reserved region; and
removing the second conductive layer on the first conductive layer unreserved region, wherein the via electrically connects the first conductive layer and the second conductive layer.

20. The manufacturing method according to claim 19, wherein the passivation layer on the first conductive layer reserved region is completely removed, the method further comprising:
partially removing the insulating layer on the first conductive layer reserved region.

* * * * *

UNITED STATES PATENT AND TRADEMARK OFFICE
CERTIFICATE OF CORRECTION

PATENT NO. : 10,606,132 B2
APPLICATION NO. : 15/542000
DATED : March 31, 2020
INVENTOR(S) : Hewei Wang et al.

Page 1 of 1

It is certified that error appears in the above-identified patent and that said Letters Patent is hereby corrected as shown below:

In the Claims

In Claim 12, Column 11, Line 19, delete "layer," and insert therefor -- layer; --.
In Claim 17, Column 12, Line 3, delete "each other," and insert therefor -- each other; --.
In Claim 19, Column 12, Line 34, delete "insulating layer," and insert therefor -- insulating layer; --.
In Claim 19, Column 12, Line 39, delete "conductive layer," and insert therefor -- conductive layer; --.

Signed and Sealed this
Fourth Day of August, 2020

Andrei Iancu
*Director of the United States Patent and Trademark Office*